United States Patent
Matsuda

(10) Patent No.: US 10,275,695 B2
(45) Date of Patent: Apr. 30, 2019

(54) INFORMATION PROCESSING APPARATUS, INFORMATION PROCESSING METHOD, AND INFORMATION PROCESSING SYSTEM FOR PROCESSING FUNCTION REQUESTS RECEIVED OVER DIFFERENT COMMUNICATION INTERFACES

(71) Applicant: Toru Matsuda, Kanagawa (JP)

(72) Inventor: Toru Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 47 days.

(21) Appl. No.: 14/729,198

(22) Filed: Jun. 3, 2015

(65) Prior Publication Data
US 2015/0356389 A1 Dec. 10, 2015

(30) Foreign Application Priority Data
Jun. 6, 2014 (JP) .................................. 2014-118157

(51) Int. Cl.
| | |
|---|---|
| *G06F 3/12* | (2006.01) |
| *H04N 1/00* | (2006.01) |
| *G06K 15/00* | (2006.01) |
| *G06K 15/02* | (2006.01) |

(52) U.S. Cl.
CPC ....... *G06K 15/4005* (2013.01); *G06F 3/1222* (2013.01); *G06F 3/1236* (2013.01); *G06F 3/1239* (2013.01); *G06F 3/1285* (2013.01); *G06F 3/1292* (2013.01); *G06K 15/022* (2013.01); *G06K 15/1823* (2013.01); *G06K 15/407* (2013.01); *G06K 15/4065* (2013.01)

(58) Field of Classification Search
CPC .... G06F 3/1285; G06F 3/1288; G06F 3/1222; G06F 3/1236; G06F 3/1239; G06F 3/1292; G06F 3/1238; G06K 15/4005; G06K 15/4065; G06K 15/407; G06K 15/4075; G06K 15/022; G06K 15/823; G06K 15/1823; G06K 15/4095
USPC ................................................ 358/1.14, 1.15
See application file for complete search history.

(56) References Cited

U.S. PATENT DOCUMENTS

| | | | | |
|---|---|---|---|---|
| 7,983,402 | B2 * | 7/2011 | Ohara | G06F 21/608 358/1.15 |
| 8,879,102 | B2 * | 11/2014 | Saka | H04N 1/00347 358/1.13 |
| 2005/0078337 | A1 * | 4/2005 | Ichikawa | G06F 3/1292 358/1.15 |

(Continued)

FOREIGN PATENT DOCUMENTS

JP 5240170 4/2013

*Primary Examiner* — Benny Q Tieu
*Assistant Examiner* — Juan M Guillermety
(74) *Attorney, Agent, or Firm* — Oblon, McClelland, Maier & Neustadt, L.L.P.

(57) ABSTRACT

An information processing apparatus that includes a plurality of communicating units, and that is capable of performing at least one function, includes an identifying unit and a processing unit. The identifying unit identifies the communicating unit connected to an external device. The processing unit performs processing corresponding to the communicating unit identified by the identifying unit, by using correspondence information that indicates correspondence between the communicating unit and regulation information.

11 Claims, 7 Drawing Sheets

| COMMUNICATING-UNIT IDENTIFYING INFORMATION | COMMUNICATING UNIT |
|---|---|
| 1 | COMMUNICATION I/F 15 (NIC) |
| 2 | COMMUNICATION I/F 25 (WIRELESS LAN I/F) |

(56) References Cited

U.S. PATENT DOCUMENTS

| | | | | |
|---|---|---|---|---|
| 2007/0229877 A1* | 10/2007 | Shima | G06F 3/1285 | 358/1.14 |
| 2008/0027569 A1* | 1/2008 | Okigami | G06F 3/1285 | 700/83 |
| 2009/0285190 A1* | 11/2009 | Baron | H04L 12/2867 | 370/338 |
| 2010/0214602 A1* | 8/2010 | Moriwaki | G06F 3/1235 | 358/1.15 |
| 2011/0157645 A1* | 6/2011 | Okutsu | G06F 3/1236 | 358/1.15 |
| 2011/0292445 A1 | 12/2011 | Kato | | |
| 2012/0250070 A1* | 10/2012 | Sakamoto | G06F 3/121 | 358/1.14 |
| 2012/0257226 A1* | 10/2012 | Okada | H04N 1/2338 | 358/1.9 |
| 2013/0054774 A1* | 2/2013 | Kikuchi | G06F 3/1288 | 709/223 |
| 2013/0259025 A1* | 10/2013 | Terashita | G06F 3/1236 | 370/351 |
| 2014/0226185 A1* | 8/2014 | Iwasa | G06K 15/401 | 358/1.16 |
| 2014/0268218 A1* | 9/2014 | Yoda | G06F 3/1285 | 358/1.15 |
| 2014/0293331 A1* | 10/2014 | Asai | G06F 3/1286 | 358/1.15 |
| 2014/0344107 A1* | 11/2014 | Nakamura | G06Q 30/0633 | 705/26.8 |
| 2014/0355050 A1* | 12/2014 | Sakai | G06F 3/1292 | 358/1.15 |
| 2014/0359701 A1* | 12/2014 | Kikuchi | G06F 3/1238 | 726/3 |
| 2015/0036168 A1* | 2/2015 | Oguro | G06F 3/1204 | 358/1.14 |

* cited by examiner

| COMMUNICATING-UNIT IDENTIFYING INFORMATION | COMMUNICATING UNIT |
|---|---|
| 1 | COMMUNICATION I/F 15 (NIC) |
| 2 | COMMUNICATION I/F 25 (WIRELESS LAN I/F) |

| COMMUNICATING UNIT | REGULATION INFORMATION |
|---|---|
| FIRST GROUP | MONOCHROME PRINT REQUEST AND COLOR PRINT REQUEST ARE PERMITTED |
| SECOND GROUP | MONOCHROME PRINT REQUEST IS PERMITTED, BUT COLOR PRINT REQUEST IS NOT PERMITTED |

FIG.7

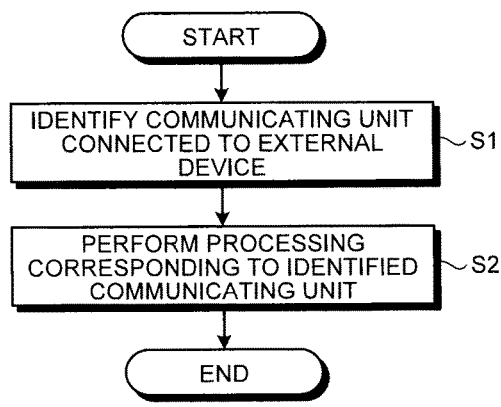

FIG.8

| COMMUNICATING UNIT | REGULATION INFORMATION |
|---|---|
| FIRST GROUP | ·FUNCTION REQUEST WITHOUT USER VERIFICATION IS REFUSED<br>·FUNCTION REQUEST WITH USER VERIFICATION EXCEPT PRINT REQUEST IS PERMITTED<br>·FOR PRINT REQUEST WITH USER VERIFICATION, OUTPUT ON PAPER IS HELD, AND INSTRUCTION OF OUTPUT ON PAPER THROUGH OPERATING UNIT IS REQUESTED |
| SECOND GROUP | USER VERIFICATION IS NOT INCLUDED IN CONDITIONS FOR PERMITTING FUNCTION REQUEST |

FIG.9

| COMMUNICATING UNIT | REGULATION INFORMATION |
|---|---|
| FIRST GROUP | WHEN THIRD PRINT REQUEST IS RECEIVED BY COMMUNICATING UNIT BELONGING TO FIRST GROUP IN STATE IN WHICH OUTPUT ON PAPER CORRESPONDING TO A FIRST PRINT REQUEST RECEIVED BY COMMUNICATING UNIT BELONGING TO FIRST GROUP IS HELD, THIRD PRINT REQUEST IS PERMITTED |
| SECOND GROUP | WHEN SECOND PRINT REQUEST IS RECEIVED BY COMMUNICATING UNIT BELONGING TO SECOND GROUP IN STATE IN WHICH OUTPUT ON PAPER CORRESPONDING TO FIRST PRINT REQUEST IS HELD, AND SHEETS NECESSARY FOR OUTPUT ON PAPER CORRESPONDING TO FIRST PRINT REQUEST BECOME INSUFFICIENT IF OUTPUT ON PAPER CORRESPONDING TO SECOND PRINT REQUEST IS PERFORMED, SECOND PRINT REQUEST IS REFUSED |

FIG.10

| COMMUNICATING UNIT | REGULATION INFORMATION |
|---|---|
| FIRST GROUP | WHEN PRINT REQUEST IS RECEIVED IN STATE IN WHICH REMAINING AMOUNT OF CONSUMABLE IS EQUAL TO OR SMALLER THAN THRESHOLD, PRINT REQUEST IS PERMITTED |
| SECOND GROUP | WHEN PRINT REQUEST IS RECEIVED IN STATE IN WHICH REMAINING AMOUNT OF CONSUMABLE IS EQUAL TO OR SMALLER THAN THRESHOLD, PRINT REQUEST IS REFUSED |

FIG.11

| COMMUNICATING UNIT | REGULATION INFORMATION |
|---|---|
| FIRST GROUP | WHEN FUNCTION REQUEST IS RECEIVED, PERMISSION FROM EXTERNAL DEVICE THROUGH COMMUNICATING UNIT BELONGING TO FIRST GROUP IS NOT REQUIRED |
| SECOND GROUP | WHEN FUNCTION REQUEST IS RECEIVED, PERMISSION FROM EXTERNAL DEVICE THROUGH COMMUNICATING UNIT BELONGING TO FIRST GROUP IS WAITED TO BE RECEIVED, AND THEN FUNCTION REQUEST IS PERMITTED |

FIG.12

| COMMUNICATING UNIT | REGULATION INFORMATION |
|---|---|
| FIRST GROUP | DISTANCE BETWEEN EXTERNAL DEVICE OF SOURCE OF FUNCTION REQUEST AND OWN APPARATUS IS NOT INCLUDED IN CONDITIONS FOR PERMITTING FUNCTION REQUEST |
| SECOND GROUP | WHEN FUNCTION REQUEST IS RECEIVED IN STATE IN WHICH DISTANCE BETWEEN EXTERNAL DEVICE OF SOURCE OF FUNCTION REQUEST AND OWN APPARATUS IS EQUAL TO OR LARGER THAN THRESHOLD, FUNCTION REQUEST IS REFUSED |

FIG.13

| COMMUNICATING UNIT | REGULATION INFORMATION |
|---|---|
| NIC1 | ·FUNCTION REQUEST WITHOUT USER VERIFICATION IS REFUSED<br>·FUNCTION REQUEST WITH USER VERIFICATION EXCEPT PRINT REQUEST IS PERMITTED<br>·FOR PRINT REQUEST WITH USER VERIFICATION, OUTPUT ON PAPER IS HELD, AND OUTPUT ON PAPER THROUGH OPERATING UNIT IS REQUESTED |
| NIC2 | ·USER VERIFICATION IS NOT INCLUDED IN CONDITIONS FOR PERMITTING FUNCTION REQUEST |

# INFORMATION PROCESSING APPARATUS, INFORMATION PROCESSING METHOD, AND INFORMATION PROCESSING SYSTEM FOR PROCESSING FUNCTION REQUESTS RECEIVED OVER DIFFERENT COMMUNICATION INTERFACES

CROSS-REFERENCE TO RELATED APPLICATIONS

The present application claims priority to and incorporates by reference the entire contents of Japanese Patent Application No. 2014-118157 filed in Japan on Jun. 6, 2014.

BACKGROUND OF THE INVENTION

1. Field of the Invention

The present invention relates to an information processing apparatus, an information processing method, and an information processing system.

2. Description of the Related Art

When an organization such as a company uses an apparatus such as a multifunction peripheral (MFP) of a shared resource of the organization, there are cases where operation following an operation policy (may be referred to as "regulation information" in the following explanation) prescribed by the organization, such as request for user verification and imposition of limitations on the number of sheets and the time of use, is demanded. Moreover, to use an apparatus of the shared resource of the organization from personal computers (PC), mobile terminals, and the like, more than one communication form, such as Ethernet (registered trademark), Bluetooth (registered trademark), and Wi-Fi direct, can be used.

For example, in Japanese Patent No. 5240170, for the purpose of preventing leakage of information that can be caused by printing from an image forming apparatus without putting a load on users or an administrator, a technique has been disclosed in which at least two communicating units of a short-range wireless-communicating unit and a close-range wireless-communicating unit are provided, the close-range wireless communication is established based on communication setting information received through the short-range wireless-communicating unit, and print subject data and control information are communicated through the close-range communicating unit.

However, in conventional techniques, a system in which different regulation information is applied according to a difference in the communicating unit has not been provided.

SUMMARY OF THE INVENTION

It is an object of the present invention to at least partially solve the problems in the conventional technology.

There is provided an information processing apparatus that includes a plurality of communicating units, and that is capable of performing at least one function. The apparatus includes an identifying unit that identifies the communicating unit connected to an external device, and a processing unit that performs processing corresponding to the communicating unit identified by the identifying unit, by using correspondence information that indicates correspondence between the communicating unit and regulation information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart showing an operation example of the MFP of the embodiment;

FIG. 8 is a diagram showing one example of correspondence information of a modification;

FIG. 9 is a diagram showing one example of the correspondence information of a modification;

FIG. 10 is a diagram showing one example of the correspondence information of a modification;

FIG. 11 is a diagram showing one example of the correspondence information of a modification;

FIG. 12 is a diagram showing one example of the correspondence information of a modification; and FIG. 13 is a diagram showing one example of the correspondence information of a modification.

DETAILED DESCRIPTION OF THE PREFERRED EMBODIMENTS

An embodiments of an information processing apparatus, an information processing method, and an information processing system according to the present invention is explained in detail below with reference to the accompanying drawings. Although the information according to the present invention is explained with an example of an MFP (Multi-function Peripheral) in the following explanation, it is not limited thereto. The information processing apparatus according to the present invention are only required to be an information processing apparatus that has more than one communicating unit and at least one function.

Figure 1:
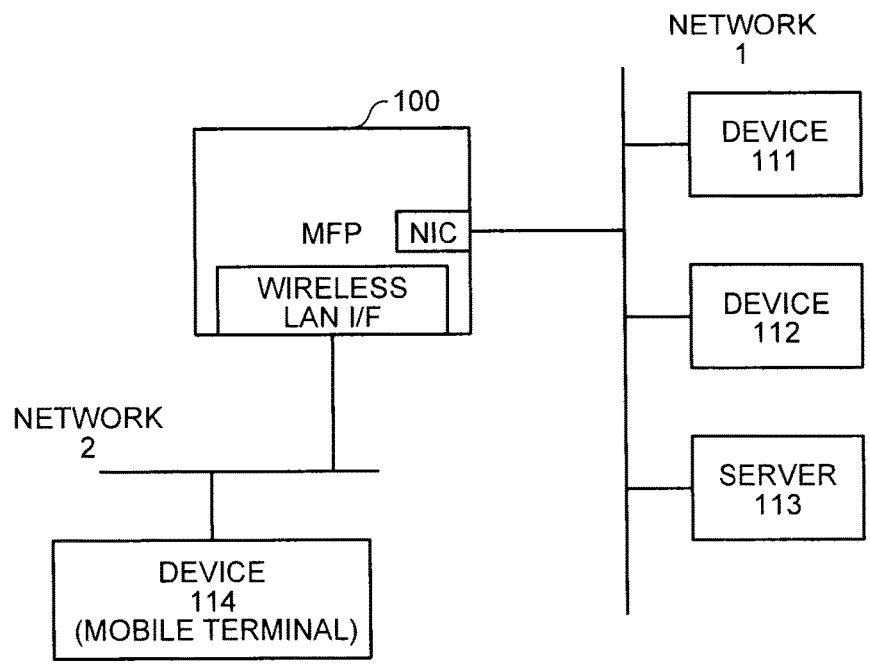
FIG. 1 is a diagram showing one example of a network configuration including an MFP of an embodiment.

FIG. 1 is a diagram showing one example of a network configuration including an MFP 100 that includes a network interface card (NIC) being an interface to connect to a network 1, and a wireless local-area-network (LAN) interface (I/F) being an interface to connect to a network 2. In the example shown in FIG. 1, to the network 1, a device 111, a device 112, and a server 113 that are used by a user belonging to an organization that has the MFP 100 as a shared resource are connected. Furthermore, to the network 2, a device 114 (for example, a mobile terminal, and the like) that is used by an external user not belonging to the organization is connected.

It may be configured such that a wireless LAN I/F is arranged in place of the NIC, and the wireless LAN I/F functions as an interface to connect to the network 1, or be configured such that an NIC is arranged in place of the wireless LAN I/F, and the NIC functions as an interface to connect to the network 2.

Moreover, in the example shown in FIG. 1, the network 1 and the network 2 are independent of each other, and cannot communicate with each other. Therefore, the device 114 that is connected to the network 2 cannot be connected to the network 1.

Figure 2:
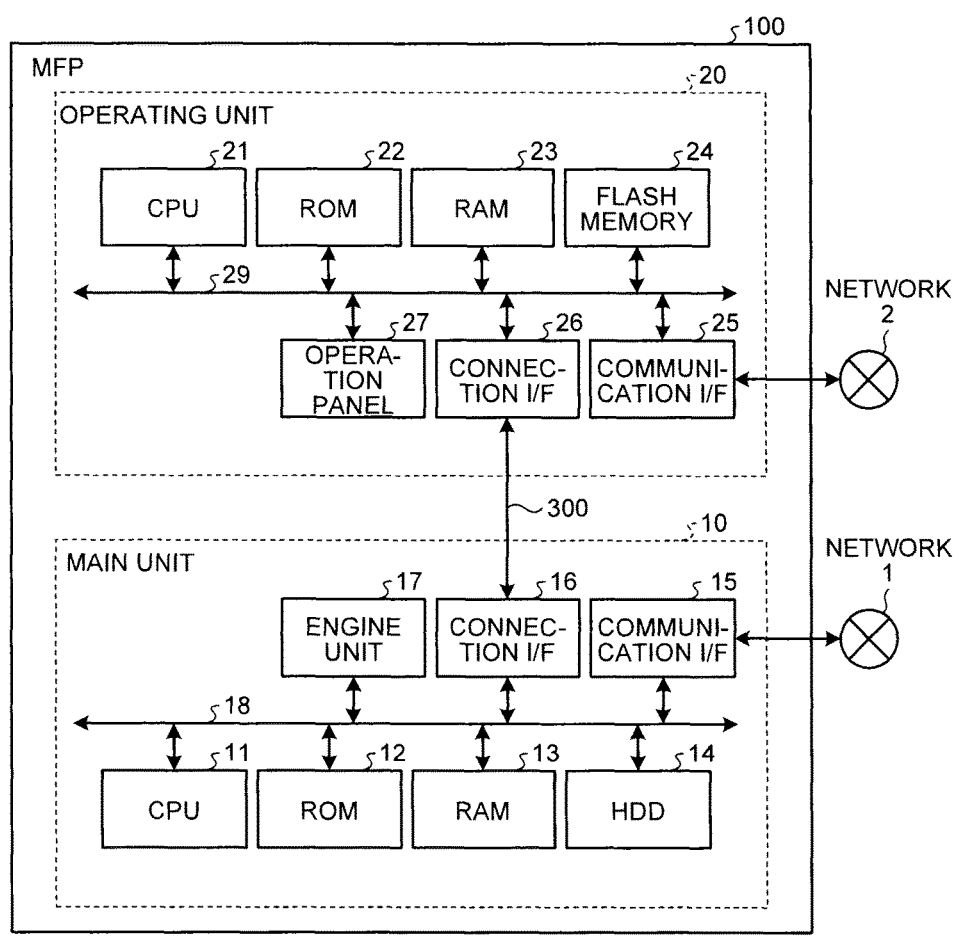
FIG. 2 is a diagram showing one example of a hardware configuration of the MFP of the embodiment.

Next, a configuration of the MFP 100 is explained. The MFP 100 is an apparatus that has various functions such as a copier function, a scanner function, a facsimile function, and a printer function. FIG. 2 is a diagram showing one example of a hardware configuration of the MFP 100. As shown in FIG. 2, the MFP 100 includes a main unit 10 that can implement various functions such as a copier function, a scanner function, a facsimile function, and a printer function, and an operating unit 20 that accepts an operation by a user. Accepting an operation by a user is a concept including accepting information (including a signal indicating coordinate value on a screen, and the like) that is input according to the operation by the user. The main unit 10 and the operating unit 20 are connected to each other through a dedicated communication path 300 so that mutual communication is enabled. As for the communication path 300, for example, one of a universal serial bus (USB) standard can be used, but one of an arbitrary standard can be used regardless of wired or wireless.

The main unit 10 can perform an operation according to the operation accepted by the operating unit 20. Moreover, the main unit 10 can also communicate with an external device such as a client PC, and can perform an operation according to an instruction received from an external device.

First, a hardware configuration of the main unit 10 is explained. As shown in FIG. 2, the main unit 10 includes a central processing unit (CPU) 11, a read-only memory (ROM) 12, a random access memory (RAM) 13, a hard disk drive (HDD) 14, a communication I/F 15, a connection I/F 16, and an engine unit 17, and these components are connected to each other through a system bus 18.

The CPU 11 performs overall control of operations of the main unit 10. The CPU 11 uses the RAM 13 as a work area, and controls operations of the entire main unit 10 by executing a program stored in the ROM 12, the HDD 14, or the like, to implement various functions such as a copier function, a scanner function, a facsimile function, and a printer function described above.

The communication I/F 15 is an interface to connect to the network 1 described above, and is configured with an NIC in this example. The connection I/F 16 is an interface to communicate with the operating unit 20 through the communication path 300.

The engine unit 17 is hardware that performs processing other than general-purpose information processing and communication, to implement a copier function, a scanner function, a facsimile function, and a printer function.

For example, a scanner (image scanning unit) that scans to read an image of an original, a plotter (image forming unit) that performs printing onto a sheet material such as a paper sheet, a facsimile unit that performs facsimile communication, and the like are provided therein. Furthermore, a specific option, such as a finisher to sort printed sheet materials, and an automatic document feeder (ADF) that automatically feed originals, can also be provided.

Next, a hardware configuration of the operating unit 20 is explained. As shown in FIG. 2, the operating unit 20 includes a CPU 21, a ROM 22, a RAM 23, a flash memory 24, a communication I/F 25, a connection I/F 26, and an operation panel 27, and these components are connected to each other through a system bus 29.

The CPU 21 performs overall control of operations of the operating unit 20. The CPU 21 uses the RAM 23 as a work area, and controls operations of the entire operating unit 20 by executing a program stored in the ROM 22, the flash memory 24, or the like, to implement various functions described later, such as a function of displaying information (image) according to an accepted input from a user.

The communication I/F 25 is an interface to connect to the network 2 described above, and is configured with a wireless LAN I/F in this example. In the following explanation, the communication I/F 25 of the operating unit 20 and the communication I/F 15 of the main unit 10 are referred to as simply "communication unit", when not distinguished from each other. The connection I/F 26 is an interface to communicate with the main unit 10 through the communication path 300.

The operation panel 27 accepts various kinds of inputs according to operations by a user, and displays various kinds of information (for example, information according to an accepted operation, information indicating an operating state of the MFP 100, information indicating settings, and the like). In this example, the operation panel 27 is configured with a liquid-crystal display (LCD) on which a touch panel function is mounted, but it is not limited thereto. For example, it may be configured with an organic electroluminescence (EL) display on which a touch panel function is mounted. Furthermore, in addition to this, or in place of this, an operating unit such as hardware keys, and a display unit such as lamps, can be provided.

Figure 3:
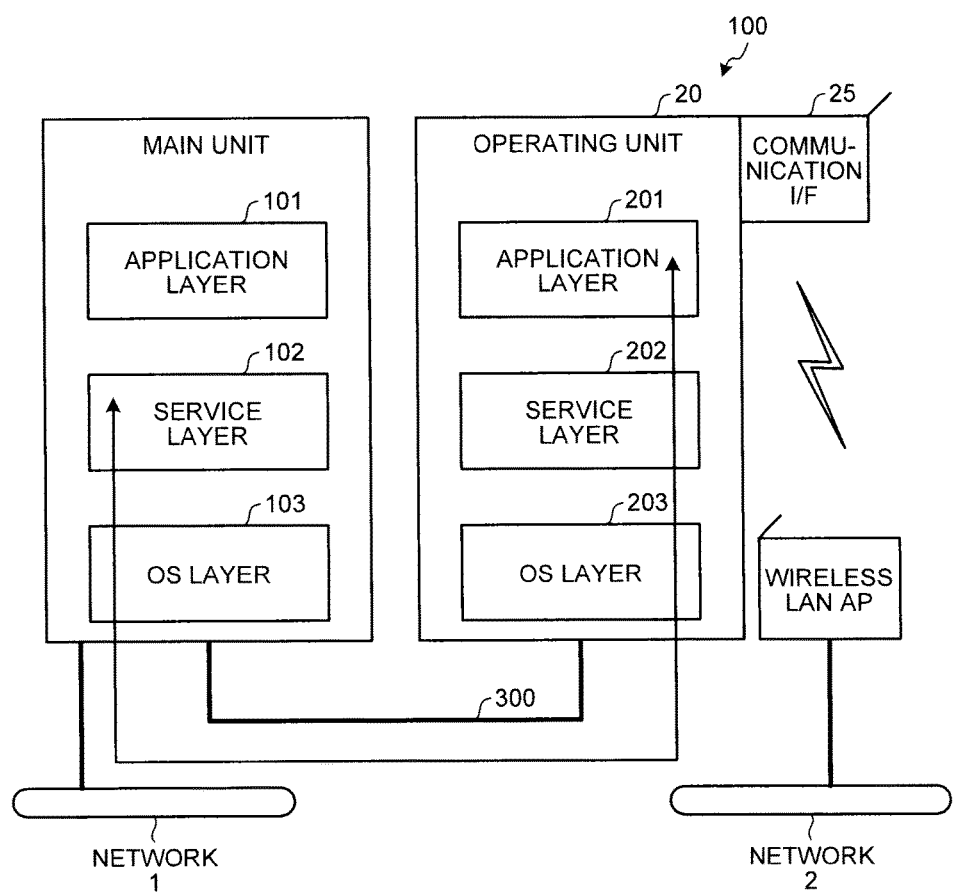
FIG. 3 is a schematic diagram showing one example of a software configuration of the MFP of the embodiment.

Next, a software configuration of the MFP 100 is explained. FIG. 3 is a schematic diagram showing one example of a software configuration of the MFP 100. As shown in FIG. 3, the main unit 10 includes an application layer 101, a service layer 102, and an operating system (OS) layer 103. The substances of the application layer 101, the service layer 102, and the OS layer 103 are various kinds of software stored in the ROM 12, the HDD 14, and the like. By executing the software by the CPU 11, the respective functions are provided.

The software of the application layer 101 is application software (referred to as simply "app" in the following explanation in some cases) to provide a predetermined function by activating a hardware resource. For example, as the app, a copier app to provide a copier function, a scanner app to provide a scanner function, a facsimile app to provide a facsimile function, a printer app to provide a printer function, and the like can be named.

The software of the service layer 102 is present between the application layer 101 and the OS layer 103, and is software to provide an interface to use a hardware resource that is equipped in the main unit 10 to apps. More specifically, it is software to provide a function of accepting an operation request to the hardware resource and of performing arbitration of the operation request. As an operation request that the service layer accepts, requests for reading by a scanner, printing by a plotter, and the like can be considered.

The interface function by the service layer 102 is provided not only to the application layer 101 of the main unit 10, but also to the application layer 201 (the apps) of the operating unit 20. That is, also the application layer 201 of the operating unit 20 can implement a function using a hardware resource (for example, the engine unit 17) of the main unit 10 through the interface function of the service layer 102.

The software of the OS layer 103 is basic software (operating system) to provide basic functions to control hardware equipped in the main unit 10. The software of the service layer 102 converts a request for use of a hardware resource from various kinds of apps into a command readable by the OS layer 103 to transfer to the OS layer 103. By executing the command by the software of the OS layer 103, the hardware resource performs operation according to the request from the app.

Similarly, the operating unit 20 includes the application layer 201, the service layer 202, and the OS layer 203. The application layer 201, the service layer 202, and the OS layer 203 in the operating unit 20 has the hierarchical structure similar to that of the main unit 10. However, functions provided by the apps of the application layer 201 and types of acceptable operation requests of the service layer 202 are different from those of the main unit 10. The apps of the application layer 201 may be software to provide a predetermined function by operating a hardware resource equipped in the operating unit 20; however, mainly, the apps are software to provide a function of a user interface (UI) to perform operation and display relating to the functions (the function of a copier, the function of a scanner, the function of a facsimile, and the function of a printer) of the main unit 10.

In the present embodiment, to maintain independence of the functions, the software of the OS layer 103 of the main unit 10 and the software of the OS layer 203 of the operating unit 20 differ from each other. That is, the main unit 10 and the operating unit 20 operate independently of each other by independent operating systems. For example, it is possible to use Linux (registered trademark) as the software of the OS layer 103 of the main unit 10, and Android (registered trademark) as the software of the OS layer 203 of the operating unit 20.

As described above, in the MFP 100 of the present embodiment, because the main unit 10 and the operating unit 20 operate by independent operating systems, communication between the main unit 10 and the operating unit 20 is not interprocess communication in a common apparatus, but is performed as communication between separate apparatuses. An operation to transfer information (instruction from a user) that is accepted by the operating unit 20 to the main unit 10 (command communication), operation to inform an event from the main unit 10 to the operating unit 20, and the like correspond to this communication. In this example, by performing command communication from the operating unit 20 to the main unit 10, a function of the main unit 10 can be used. As an event to inform from the main unit 10 to the operating unit 20, an executing state of an operation in the main unit 10, a setting made in the main unit 10, and the like are named.

In this example, it can be regarded that the communication I/F 25 of the operating unit 20 corresponds to a "first communicating unit" in claims, and the operating unit 20 corresponds to a "first information-processing apparatus" in claims. Furthermore, in this example, it can be regarded that the communication I/F 15 of the main unit 10 corresponds to a "second communicating unit" in claims, and the main unit 10 corresponds to a "second information-processing apparatus" in claims. That is, in this example, it can be regarded that the MFP 10 corresponds to an "information processing system" in claims.

Figures 4, 5, 6:
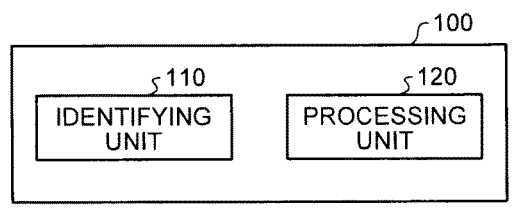
FIG. 4 is a diagram showing one example of a functional configuration of the MFP of the embodiment.
FIG. 5 is a diagram showing one example of communication-unit identifying information of the embodiment.
FIG. 6 is a diagram showing one example of correspondence information of the embodiment.

FIG. 4 is a diagram showing one example of a functional configuration of the MFP 100. For convenience of explanation, although functions according to the present invention are mainly exemplified in FIG. 4, functions of the MFP 100 are not limited to thereto. As shown in FIG. 4, the MFP 100 includes an identifying unit 110, and a processing unit 120.

The identifying unit 110 identifies a communicating unit connected to an external device. In the present embodiment, when either of the communication I/F 15 of the main unit 10 and the communication I/F 25 of the operating unit 20 included in the MFP 100 is connected to an external device such as a PC and a mobile terminal, the OS layer 103 of the main unit 10 detects the connection, and identifies the communicating unit connected to the external device. For example, when the communication I/F 25 of the operating unit 20 is connected to an external device (when communication between the external device and the communication I/F 25 is established), and a function request to request for performing a function of the MFP 100 is received from the external device, the OS layer 203 of the operating unit 20 provides communicating-unit identifying information (information to identify the communication I/F 25 in this example) to identify a communicating unit connected to the external device, and communication information including a function request from the external device, to the OS layer 103 of the main unit 10 through the application layer 201. The OS layer 103 of the main unit 10 can identify the communication I/F 25 of the operating unit 20 as the communicating unit connected to the external device from the communicating-unit identifying information included in the communication information.

In this example, as shown in FIG. 5, the communicating-unit identifying information is to be information to distinguish the communication I/F 15 (NIC) of the main unit 10 and communication I/F 25 (wireless LAN I/F) of the operating unit 20 from each other. In the example shown in FIG. 5, communicating-unit identifying information indicating the communication I/F 15 of the main unit 10 (NIC) is expressed by a numeral "1", and communicating-unit identifying information indicating the communication I/F 25 (wireless LAN I/F) of the operating unit 20 is expressed by a numeral "2"; however, it is not limited thereto, and the form of the communicating-unit identifying information is arbitrary, and is only necessary to be information distinguishing the communication I/F 15 (NIC) of the main unit 10 and communication I/F 25 (wireless LAN I/F) of the operating unit 20 from each other. For example, as communicating-unit identifying information indicating the communication I/F 15 (NIC) of the main unit 10, a characteristic string like "NIC" can be used, and as communicating-unit identifying information indicating the communication I/F 25 (wireless LAN I/F) of the operating unit 20, a character string like "WLAN" can be used.

Moreover, when more communicating units are present, for example, when the main unit 10 has two NICs, one wireless LAN I/F, one near field communication (NFC) interface, and one Bluetooth (registered trademark) interface, and the operating unit 20 has one Wi-Fi direct access point, the communicating-unit identifying information is to be information enabling to distinguish all of them from each other.

The OS layer 103 of the main unit 10 provides the communicating-unit identifying information to identify a communicating unit connected to an external device, and information indicating a function request from the external device, to the service layer 102 and the application layer 101. In this example, the function of the identifying unit 110 is implemented by the OS layer 103 of the main unit 10, but is not limited thereto. In other words, it is only necessary that the MFP 100 to which the present invention is applied has the function of the identifying unit 110. In the present embodiment, it can be regarded that the identifying unit 110 has the function of identifying the communication I/F 25 (corresponding to the "first communicating unit" in claims) of the operating unit 20 connected to an external device or the communication I/F 15 (corresponding to the "second communicating unit" in claims) of the main unit 10.

Next, the processing unit 120 shown in FIG. 4 is explained. The processing unit 120 performs, using correspondence information that indicates correspondence between a communicating unit and regulation information (for example, operation policy), processing according to the communicating unit identified by the identifying unit 110. More specifically, the processing unit 120 performs processing to determine whether the function request received by the communicating unit is acceptable. Details thereof are explained below. First, the processing unit 120 selects the regulation information that is associated with the communicating unit identified by the identifying unit 110, from among pieces of regulation information included in the correspondence information. In the present embodiment, the correspondence information is information in which different regulation information is associated with each of groups having at least one communicating unit. In this example, the groups include a first group and a second group described later. For example, the correspondence information may be information in which different regulation information is associated with each communicating unit (information in which multiple communicating units and different kinds of regulation information are associated with each other in one to one correspondence). Alternatively, the correspondence information may take a fixed form by hard coding, or take a form enabling to be changed according to an input by an administrator, and the like.

In this example, when the MFP is used, the regulation information is information (including procedures, standards, and the like) that is required to determine whether a function request received from an external device is acceptable, and for example, can be considered to indicate information necessary to determine whether to request identification/verification of a user, whether to request payment, whether to hold output on paper when a print request is received from an external device and to output on paper after an instruction from the operating unit 20 is received, whether to permit color printing, whether to permit an administrator operation, whether to permit use after predetermined hours, whether to permit print over 100 sheets a day, whether to permit print that causes a state in which remaining sheets are 500 or less, and the like.

FIG. 6 is a diagram showing one example of the correspondence information of the present embodiment. In this example, the communication I/F 15 (NIC) of the main unit 10 belongs to the first group, and the communication I/F 25 (wireless LAN I/F) of the operating unit 20 belongs to the second group. The regulation information associated with the first group indicates that when a monochrome print request to request performance of monochrome printing is received (when received by the communicating unit belonging to the first group), performance of monochrome printing that is requested by the received monochrome print request is permitted, and when a color print request to request performance of color printing is received, performance of color printing that is requested by the received color print request is permitted. That is, it indicates that a monochrome print request and a color print request are permitted.

On the other hand, the regulation information associated with the second group indicates that when a monochrome print request is received (when received by a communicating unit belonging to the second group), performance of monochrome printing that is requested by the received monochrome print request is permitted, while when a color print request is received, performance of color printing that is requested by the received color print request is not permitted. That is, it indicates that a monochrome print request is permitted, while a color print request is not permitted. The storage location of the correspondence information is arbitrary, and the correspondence information may be stored in the main unit 10, may be stored in the operating unit 20, or may be stored in an external server, or the like. The correspondence information shown in FIG. 6 can be regarded as information that indicates correspondence between the communication I/F 25 (corresponding to the "first communicating unit" in claims) of the operating unit 20 or the communication I/F 15 (corresponding to the "second communicating unit" in claims) of the main unit 10 and the regulation information.

In the present embodiment, the service layer 102 or the application layer 101 of the main unit 10 first judges a group to which a communicating unit that has been identified based on the communicating-unit identifying information provided from the OS layer 103 belongs. The correspondence information is then referred to, and the regulation information that is associated with the group is selected; however, it is not limited thereto.

Next, the processing unit 120 performs processing to determine whether a function request received by the communicating unit is acceptable, according to the selected regulation information. In the present embodiment, the service layer 102 and the application layer 101 of the main unit 10 work together to perform processing to determine whether the function request is acceptable, and perform processing according to the determination, according to the regulation information corresponding to the communicating unit that has received the function request from an external device. For example, when refusal of the function request is determined, processing to refuse the function request is performed, and when permission of the function request is determined, processing to perform the function requested by the function request is performed.

For example, a case in which a color print request from an external device (for example, the device 114 belonging to the network 2) is received by the communication I/F 25 of the operating unit 20 is assumed. In this case, the regulation information associated with the second group to which the communication I/F 25 belongs indicates that a color print request is not permitted (refer to FIG. 6), and therefore, the service layer 102 and the application layer 101 of the main unit 10 performs processing to refuse the color print request received by the communication I/F 25 of the operating unit 20. Moreover, for example, a case in which a color print request from an external device (for example, the device 111 belonging to the network 1) is received by the communication I/F 15 of the main unit 10 is assumed. In this case, the regulation information associated with the first group to which the communication I/F 15 belongs indicates that a color print request is permitted (refer to FIG. 6), and therefore, the service layer 102 and the application layer 101 of the main unit 10 performs processing to perform color printing requested by the color print request received by the communication I/F 15.

Although the function of the processing unit 120 is implemented by the service layer 102 and the application layer 101 of the main unit 10 in this example, it is not limited thereto. In other words, it is only necessary that the MFP 100 to which the present invention is applied has the function of the processing unit 120. Furthermore, in the present embodiment, it can be regarded that the processing unit 120 performs processing corresponding to the communication I/F 25 of the operating unit 20 or the communication I/F 15 of the main unit 10 identified by the identifying unit 110, using the correspondence information that indicates correspondence between the communication I/F 25 (corresponding to the "first communicating unit" in claims) of the operating unit 20 or the communication I/F 15 (corresponding to the "second communicating unit" in claims) of the main unit 10 connected to an external device and the regulation information.

FIG. 7 is a flowchart showing an operation example of the MFP 100 of the present embodiment. As shown in FIG. 7, the identifying unit 110 identifies a communicating unit (in this example, the communication I/F 15 of the main unit 10 or the communication I/F 25 of the operating unit 20) that is connected to an external device (step S1). Subsequently, the processing unit 120 performs processing that corresponds to the communicating unit identified at step S1 (step S2). As described above, the processing unit 120 refers to the correspondence information described above, selects regulation information that corresponds to the communicating unit identified at step S1, and performs processing to determine whether a function request that is received by the communicating unit identified at step S1 is acceptable, and the like according to the selected regulation information.

Note that for example, when the communication I/F 25 of the operating unit 20 receives a function request from an external device and the function requested by the received function request can be achieved only in the operating unit 20 (when it is not necessary to use a function of the main unit 10), it is possible for the operating unit 20 to perform the flow shown in FIG. 7. Moreover, even when a function request from an external device received by the communication I/F 25 of the operating unit 20 requires to use a function of the main unit 10, for example, the operating unit 20 can perform processing from step S1 to S2 shown in FIG. 7, and provide information indicating a result thereof (information indicating the regulation information that corresponds to the communication I/F 25 of the operating unit 20, and communicating-unit identifying information to identify the communication I/F 25) to the OS layer 103 of the main unit 10.

As described above, the MFP 100 of the present embodiment can identify a communicating unit that is connected to an external device (in this example, the communication I/F 15 of the main unit 10 or the communication I/F 25 of the operating unit 20), and can perform processing corresponding to the identified communicating unit using the correspondence information that indicates correspondence between communicating unit and regulation information. Thus, regulation information that is different according to which communicating unit is used can be applied.

The embodiment of the present invention has been explained above, but the present invention is not limited to the embodiment described above as it is, and can be implemented, modifying the components within the scope not departing from the invention, in the practical phase. Furthermore, with appropriate combination of the components disclosed in the embodiment described above, various kinds of invention can be created. For example, some of the components may be removed from all of the components indicated in the embodiment.

(Modification)
Modifications are described below. The modifications below can be arbitrarily combined. Moreover, the modifications below can be arbitrarily combined with the embodiment described above.

(1) Modification 1

FIG. 8 is a diagram showing correspondence information of a present modification. In the example shown in FIG. 8, regulation information associated with the first group indicates that a function request without user verification is refused, a function request with user verification except printing is permitted, and as for a print request with user verification, output on paper is held and an instruction of output on paper through the operating unit 20 is requested. However, the function request can be refused with some other reasons, even if permitted by this regulation information. Although the method of judging whether a function request from an external device has been subjected to user verification is arbitrary, in this example, it is possible to judge whether the function request has been subjected to user verification by determining whether input data to perform the user verification or information indicating the result of the user verification is included in the function request.

For example, when the regulation information associated with the first group indicated in FIG. 8 is selected, the processing unit 120 determines whether user identification information (for example, a user identification (ID), and the like) and user verification information (for example, a password, and the like) that are one example of input data to perform user verification are included, or information indicating conversion, such as encryption and application of a hash, applied to at least one thereof is included in a function request received by the communicating unit (the communication I/F 15 of the main unit 10 in this example) that belongs to the first group, thereby judging whether the function request has been subjected to the user verification.

Moreover, for example, the processing unit 120 determines whether a pair of short-term information (token) indicating that user verification has been succeeded and user identification information is included in a function request received by the communicating unit (the communication I/F 15 of the main unit 10 in this example) belonging to the first group, thereby judging whether the function request has been subjected to user verification. The user verification may be performed by the MFP 100, or be performed by an external verification server, or the like.

Furthermore, for example, the processing unit 120 determines whether a token that indicates that user verification has been succeeded and that includes user identification information converted into a predetermined format is included in a function request received by the communicating unit (the communication I/F 15 of the main unit 10 in this example) belonging to the first group, thereby judging whether the function request has been subjected to user verification.

On the other hand, in the example shown in FIG. 8, regulation information associated with the second group indicates that whether user verification is performed is not included in the conditions for permitting a function request. For example, when the regulation information associated with the second group shown in FIG. 8 is selected, the processing unit 120 does not perform determination whether input data to perform user verification or information indicating a result of user verification is included in a function request received by the communicating unit (the communication I/F 25 of the operating unit 20 in this example) belonging to the second group. However, as the regulation information associated with the second group, conditions other than user verification (for example, a condition in which only a function request within a predetermined time period is permitted) is set, and if a function request received by the communicating unit belonging to the second group does not satisfy the condition, the processing unit 120 refuses the function request.

(2) Modification 2

FIG. 9 is a diagram showing correspondence information of a present modification. In the example shown in FIG. 9, the regulation information associated with the second group indicates that a second print request is refused when the second print request indicating a function request for requesting performance of printing is received by the communicating unit belonging to the second group in a state in which output on paper corresponding to a first print request indicating a function request for requesting performance of printing received by the communicating unit belonging to the first group is held, and, in addition, sheets necessary for output on paper corresponding to the first print request becomes insufficient if output on paper corresponding to the second print request is performed. That is, this regulation information indicates that for example, when a print request ("second print request") from the device 114 belonging to the network 2 is received by the communication I/F 25 of the operating unit 20 in a state in which output on paper corresponding to a print request ("first print request") received by the communication I/F 15 of the main unit 10 is held, and in addition if output on paper corresponding to the second print request is performed, sheets necessary for output on paper corresponding to the first print request becomes insufficient, the second print request is refused.

On the other hand, in the example shown in FIG. 9, regulation information associated with the first group indicates that when a third print request indicating a function request for newly requesting performance of printing is received by the communicating unit belonging to the first group in a state in which output on paper corresponding to the first print request indicating a function request for requesting performance of printing received by the communicating unit belonging to the first group is held, the third print request is permitted.

(3) Modification 3

For example, the multiple groups to which different regulation information are associated include specific groups, and regulation information associated with the specific groups may indicate that a print request is refused when the print request indicating a function request for requesting performance of printing is received in a state in which a remaining amount of a consumable (for example, toner, paper sheets, and the like) that is consumed in printing is equal to or smaller than a threshold. FIG. 10 is a diagram showing an example of the correspondence information of the present modification. In the example shown in FIG. 10, the multiple groups correspond to the first group and the second group described above, and in this example, the second group corresponds to the specific group.

In the example shown in FIG. 10, the regulation information associated with the first group indicates that a print request is permitted when the print request is received (received by the communicating unit belonging to the first group) in a state in which a remaining amount of a consumable is equal to or smaller than a threshold.

On the other hand, in the example shown in FIG. 10, the regulation information associated with the second group indicates that when a print request is received (received by the communicating unit belonging to the second group) in a state in which a remaining amount of a consumable is equal to or smaller than the threshold, the print request is refused.

(4) Modification 4

FIG. 11 is a diagram showing an example of correspondence information of a present modification. In the example shown in FIG. 11, regulation information associated with the second group indicates that when a function request is received (received by the communicating unit belonging to the second group), permission from an external device through the communicating unit belonging to the first group is waited to be received, and then the function request is permitted. For example, as the external device through the communicating unit belonging to the first group, a PC that is used by a person in charge of management of the MFP 100 (hereinafter, "management PC") and the like are named.

For example, when the regulation information associated with the second group indicated in FIG. 11 is selected, the processing unit 120 inquires of the management PC whether to accept a function request received by the communicating unit (the communication I/F 25 of the operating unit 20 in this example) belonging to the second group. The management PC that received the inquiry prompts a user for input whether to accept the function request, and the result of input is sent back to the processing unit 120 (the MFP 100). When the result of input indicates permission of the function request, the processing unit 120 can perform processing requested by the function request.

On the other hand, in the example shown in FIG. 11, regulation information associated with the first group indicates that when a function request is received (received by the communicating unit belonging to the first group), permission from an external device through the communicating unit belonging to the first group is not necessary.

(5) Modification 5

FIG. 12 is a diagram showing an example of correspondence information of a present modification. Regulation information associated with the first group indicated in FIG. 12 indicates that a distance between an external device, which is a source of a function request, and the own apparatus is not included in the conditions for permitting the function request. On the other hand, regulation information associated with the second group indicated in FIG. 12 indicates that when a function request is received in a state in which a distance between an external device, which is a source of the function request, and the own apparatus is equal to or larger than a threshold, the function request is refused. A method of detecting the distance between an external device of a source of a function request and an own apparatus (the MFP 100 in this example) is arbitrary, and for example, it may take a form of estimating a distance between the external device and the own apparatus based on the intensity of a radio wave that is used for communication between the external device and the own apparatus.

(6) Modification 6

For example, correspondence information may be information in which different regulation information is associated with each communicating unit (multiple communicating units and multiple pieces of regulation information different from each other are associated with each other in one to one correspondence). It is assumed that, for example, the MFP 100 has two NICs (NIC1, NIC2) as the multiple communicating units. In this case, NIC1 is an interface to connect to the network 1 that is used by personnel belonging to the organization using the MFP 100 as a shared resource, and NIC2 is an interface to connect to the network 2 that is used by a professional operator not belonging to the organization that uses the MFP 100 as a shared resource. One example of correspondence information of a present modification is shown in FIG. 13.

In the example shown in FIG. 13, regulation information associated with NIC1 indicates that a function request without user verification is refused, and a function request other than a print request among function requests subjected to user verification is permitted, and as for a print request subjected to user verification, output on paper is held and an instruction of output on paper through the operating unit 20 is requested. ON the other hand, the regulation information associated with NIC2 indicates that user verification is not included in the conditions for permitting a function request.

(7) Modification 7

Although the main unit 10 and the operating unit 20 operate independently of each other by independent operating systems in the embodiment described above, it is not limited thereto, and for example the main unit 10 and the operating unit 20 may operate by the same operating system. In other words, the information processing apparatus (for example the MFP 100) according to the present invention is only required to have at least a function corresponding to the identifying unit 110 described above, and a function corresponding to the processing unit 120 described above.

Program

Moreover, a program executed by the MFP 100 of the embodiment described above may be configured to be provided by recording on a computer-readable recording medium, such as a compact disc (CD)-ROM, a flexible disk (FD), a CD-recordable (CD-R), a digital versatile disk (DVD), and a USB, in a file of an installable form or an executable form, or may be configured to be provided or distributed through a network such as the Internet. Furthermore, various kinds of programs may be configured to be installed in a non-volatile recording medium such as a ROM to be provided.

According to the present invention, different regulation information can be applied according to a difference in a communicating unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multifunctional peripheral that forms an image, the multifunctional peripheral comprising:
   a main unit that includes at least a printer, processing circuitry, and a first network interface that communicates with an external device; and
   an operating unit that is provided integrally with the main unit, accepts an operation to the printer of the main unit, and communicates with the main unit as a separate apparatus, and includes processing circuitry and a second network interface that communicates with a mobile terminal,
   wherein when the external device is identified as being connected to the first network interface, the processing circuitry of the main unit refuses a print request without user verification to the multifunctional peripheral, and
   when the mobile terminal is identified as being connected to the second network interface, the processing circuitry of the main unit permits a print request that is received by the processing circuitry of the operating unit even without user verification to the multifunctional peripheral,
   wherein the processing circuitry of the main unit being further configured to
      perform (i) a first processing on a type of function request received via the first network interface and perform (ii) a second processing on the type of function request received via the second network interface based on a predetermined correspondence between each of the first network interface and the second network interface and regulation information corresponding to each of the first processing and the second processing respectively, the regulation information defining a rule for executing the type of function request and the regulation information corresponding to the first processing being different than the regulation information corresponding to the second processing,
   wherein the multifunctional peripheral includes a first operating system having a first software configuration and the operating unit includes a second operating system having a second software configuration which are different and independent of the first operating system and the first software configuration respectively, a connection between the operation unit and the main unit is established at an operating system layer, and
   wherein when the print request is received via the second network interface, the second operating system provides information identifying the second network interface to the first operating system.

2. The multifunctional peripheral according to claim 1, wherein
   the processing circuitry of the main unit performs processing to determine whether a received function request is acceptable based on regulation information.

3. The multifunctional peripheral according to claim 2, wherein
   the regulation information corresponding to the second network interface indicates that a second print request is refused when the second print request indicating the function request to request for performance of printing is received in a state in which output on paper corresponding to a first print request indicating a function request to request for performance of printing received by the first network interface is held, and in addition, sheets necessary for output on paper corresponding to the first print request becomes insufficient if output on paper corresponding to the second print request is performed.

4. The multifunctional peripheral according to claim 2, wherein
   the regulation information that is associated with the second network interface indicates that when a print request indicating the function request to request for performance of printing is received in a state in which a remaining amount of a consumable that is consumed in printing is equal to or smaller that a threshold, the print request is refused.

5. The multifunctional peripheral according to claim 2, wherein
   the regulation information corresponding to the second network interface indicates that when the function request is received from the second communication interface, permission from the external device that connects over the first network interface must be received before the function request is permitted.

6. The multifunctional peripheral according to claim 1, wherein the first network interface is a network interface card (NIC) that connects to a wired local area network (LAN) and the second network interface is a wireless LAN interface.

7. The multifunctional peripheral according to claim 1, wherein the regulation information corresponding to the first network interface permits execution of both a monochrome print request and a color print request, and the regulation information corresponding to the second network interface permits a monochrome print request but does not permit a color print request.

8. The multifunctional peripheral according to claim 1, wherein the regulation information corresponding to the first network interface prohibits execution of a function request without user verification, and the regulation information corresponding to the second network interface permits a function request without user verification.

9. The multifunctional peripheral according to claim 1, wherein the regulation information corresponding to the first network interface permits execution of a function request independent of a distance between the external device and the multifunctional peripheral, and the regulation information corresponding to the second network interface prohibits execution of a function request when a distance between the mobile device and the multifunctional peripheral is determined to be equal to or larger than a threshold.

10. The multifunctional peripheral according to claim 1, wherein
    when the operating unit receives the print request from the mobile terminal connected to the second network interface, the operating unit transmits, to the main unit, the print request and communicating-unit identifying information that identifies the second network interface connected to the mobile terminal, and
    the main unit identifies that the mobile terminal is connected to the second network interface based on the communicating-unit identifying information transmitted from the operating unit, and causes the printer to perform printing requested by the print request.

11. A method, implemented by a multifunctional peripheral that forms an image, the multifunctional peripheral including: (i) a main unit that includes at least a printer, processing circuitry, and a first network interface that communicates with an external device, and (ii) an operating unit that is provided integrally with the main unit, accepts an operation to the printer of the main unit, and communicates with the main unit as a separate apparatus, and includes a second network interface that communicates with a mobile terminal, the method comprising:
    when the external device is identified as being connected to the first network interface, refusing, by the processing circuitry of the main unit, a print request without user verification to the multifunctional peripheral; and
    when the mobile terminal is identified as being connected to the second network interface, permitting, by the processing circuitry of the main unit, a print request that is received by the processing circuitry of the operating unit even without user verification to the multifunctional peripheral,
    wherein the method further includes, by the processing circuitry of the main unit,
        performing (i) a first processing on a type of function request received via the first network interface and performing (ii) a second processing on the type of function request received via the second network interface based on a predetermined correspondence between each of the first network interface and the second network interface and regulation information corresponding to each of the first processing and the second processing respectively, the regulation information defining a rule for executing the type of function request and the regulation information corresponding to the first processing being different than the regulation information corresponding to the second processing,
    wherein the multifunctional peripheral includes a first operating system having a first software configuration and the operating unit includes a second operating system having a second software configuration which are different and independent of the first operating system and the first software configuration respectively, a connection between the operation unit and the main unit is established at an operating system layer, and
    wherein when the print request is received via the second network interface, the second operating system provides information identifying the second network interface to the first operating system.

* * * * *